(12) United States Patent
Deghel et al.

(10) Patent No.: US 12,519,518 B2
(45) Date of Patent: Jan. 6, 2026

(54) APPARATUS, METHODS, AND COMPUTER PROGRAMS

(71) Applicant: Nokia Technologies OY, Espoo (FI)

(72) Inventors: Matha Deghel, Paris (FR);
Sami-Jukka Hakola, Kempele (FI);
Mihai Enescu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 384 days.

(21) Appl. No.: 18/044,214

(22) PCT Filed: Aug. 23, 2021

(86) PCT No.: PCT/EP2021/073295
§ 371 (c)(1),
(2) Date: Mar. 7, 2023

(87) PCT Pub. No.: WO2022/053302
PCT Pub. Date: Mar. 17, 2022

(65) Prior Publication Data
US 2024/0306003 A1    Sep. 12, 2024

(30) Foreign Application Priority Data
Sep. 10, 2020   (EP) .................................... 20195524

(51) Int. Cl.
*H04B 7/06*     (2006.01)
*H04W 16/28*    (2009.01)
(Continued)

(52) U.S. Cl.
CPC .......... *H04B 7/0617* (2013.01); *H04W 16/28* (2013.01); *H04W 72/231* (2023.01); *H04W 76/20* (2018.02)

(58) Field of Classification Search
None
See application file for complete search history.

(56) References Cited

U.S. PATENT DOCUMENTS

2019/0141691 A1    5/2019  Kwon et al.
2019/0222289 A1*   7/2019  John Wilson ........ H04B 7/0626
(Continued)

FOREIGN PATENT DOCUMENTS

CN    111586862 A    8/2020
EP    3886336 A1     9/2021
(Continued)

OTHER PUBLICATIONS

International Search Report for International Application No. PCT/EP2021/073295 dated Sep. 23, 2021.
(Continued)

*Primary Examiner* — Clemence S Han
(74) *Attorney, Agent, or Firm* — Lippes Mathias LLP

(57) ABSTRACT

There is provided an apparatus arranged to receive from at least one access node a first spatial relation indication for a first transmission to be made in a first direction; receive from the at least one access node a second spatial relation indication for a second transmission to be made in a second direction; receive from the at least one access node a third indication indicating whether the second spatial relation indication is to be used for a limited duration; and use the received indications for receiving and/or transmitting signalling with at the least one access node.

18 Claims, 9 Drawing Sheets

(51) Int. Cl.
*H04W 72/231* (2023.01)
*H04W 76/20* (2018.01)

(56) References Cited

U.S. PATENT DOCUMENTS

| | | | |
|---|---|---|---|
| 2020/0077428 A1* | 3/2020 | Zhou | H04W 72/23 |
| 2020/0100232 A1 | 3/2020 | Onggosanusi et al. | |
| 2020/0204247 A1 | 6/2020 | Zhou et al. | |
| 2022/0369124 A1* | 11/2022 | Li | H04W 16/28 |
| 2023/0216565 A1* | 7/2023 | Kwak | H04B 7/0695 |
| | | | 375/267 |
| 2023/0269612 A1* | 8/2023 | Muruganathan | H04L 1/0027 |
| | | | 370/252 |
| 2023/0283436 A1* | 9/2023 | Bhamri | H04L 5/0092 |
| | | | 370/329 |

FOREIGN PATENT DOCUMENTS

| | | | |
|---|---|---|---|
| WO | 2019049096 A1 | 3/2019 | |
| WO | 2020148903 A1 | 7/2020 | |

OTHER PUBLICATIONS

"New WID: Further enhancements on MIMO for NR", 3GPP TSG RAN Meeting #86, RP-193133, Agenda: 9.1.1, Samsung, Dec. 9-12, 2019, 5 pages.

"3rd Generation Partnership Project; Technical Specification Group Radio Access Network; NR; Physical layer procedures for data (Release 16)", 3GPP TS 38.214 V16.1.0, Mar. 2020, pp. 1-151.

"3rd Generation Partnership Project; Technical Specification Group Radio Access Network; NR; Radio Resource Control (RRC) protocol specification (Release 16)", 3GPP TS 38.331 V16.0.0, Mar. 2020, pp. 1-835.

"3rd Generation Partnership Project; Technical Specification Group Radio Access Network; NR; Multiplexing and channel coding (Release 16)", 3GPP TS 38.212, V16.1.0, Mar. 2020, pp. 1-146.

Extended European Search Report received for corresponding European Patent Application No. 20195524.2, dated Jan. 28, 2021, 9 pages.

Notice of Allowance received for corresponding European Patent Application No. 20195524.2, dated Feb. 22, 2023, 8 pages.

Office Action received for corresponding Japanese Patent Application No. 2023-516162, dated Apr. 30, 2024, 3 pages of Office Action and 2 pages of summary available.

"Multi-beam enhancements", 3GPP TSG RAN WG1 #102-e, R1-2006991, Samsung, Agenda Item: 8.1.1, Aug. 17-28, 2020, 16 pages.

"Moderator summary for multi-beam enhancement", 3GPP TSG RAN WG1 #102-e, R1-2006127, Samsung, Agenda Item: 8.1.1, Aug. 17-28, 2020, 29 pages.

"Discussion on multi-beam enhancement", 3GPP TSG RAN WG1 #102-e, R1-2005363, vivo, Agenda Item: 8.1.1, Aug. 17-28, 2020, 22 pages.

"Enhancements on Multi-Beam Operation", 3GPP TSG RAN WG1 #102-e, R1-2005983, OPPO, Agenda Item: 8.1.1, Aug. 17-28, 2020, 5 pages.

"On Rel-17 FeMIMO", 3GPP TSG-RAN WG2 #116-e, R2-2110341, Ericsson, Agenda Item: 8.17.2, Nov. 1-12, 2021, 29 pages.

Office Action received for corresponding Chinese Patent Application No. 202180075557.X, dated May 23, 2025, 12 pages of Office Action documents and 3 pages of English translation.

"Discussion on Active Spatial Relation Switch". 3GPP TSG-RAN WG4 Meeting #94-e-Bis, MediaTek Inc., Electronic meeting, Apr. 20-30, 2020, 6 pages.

\* cited by examiner

APPARATUS, METHODS, AND COMPUTER PROGRAMS

CROSS-REFERENCE TO RELATED APPLICATIONS

This application is a national phase under 35 U.S.C. § 371 of PCT International Application No. PCT/EP2021/073295 which has an International filing date of Aug. 23, 2021, which claims priority to European Patent Application No. 20195524.2, filed Sep. 10, 2020, the entire contents of each of which are hereby incorporated by reference.

FIELD

The present disclosure relates to apparatus, methods, and computer programs, and in particular but not exclusively to apparatus, methods and computer programs for network apparatuses.

BACKGROUND

A communication system can be seen as a facility that enables communication sessions between two or more entities such as user terminals, access nodes and/or other nodes by providing carriers between the various entities involved in the communications path. A communication system can be provided for example by means of a communication network and one or more compatible communication devices. The communication sessions may comprise, for example, communication of data for carrying communications such as voice, electronic mail (email), text message, multimedia and/or content data and so on. Content may be multicast or uni-cast to communication devices.

A user can access the communication system by means of an appropriate communication device or terminal. A communication device of a user is often referred to as user equipment (UE) or user device. The communication device may access a carrier provided by an access node, and transmit and/or receive communications on the carrier.

The communication system and associated devices typically operate in accordance with a required standard or specification which sets out what the various entities associated with the system are permitted to do and how that should be achieved. Communication protocols and/or parameters which shall be used for the connection are also typically defined. One example of a communications system is UTRAN (3G radio). Another example of an architecture that is known is the long-term evolution (LTE) or the Universal Mobile Telecommunications System (UMTS) radio-access technology. Another example communication system is so called 5G system that allows user equipment (UE) or user device to contact a 5G core via e.g. new radio (NR) access technology or via other access technology such as Untrusted access to 5GC or wireline access technology.

SUMMARY

According to a first aspect, there is provided an apparatus for a terminal, comprising: means for receiving from at least one access node a first spatial relation indication for a first transmission to be made in a first direction; means for receiving from the at least one access node a second spatial relation indication for a second transmission to be made in a second direction; means for receiving from the at least one access node a third indication indicating whether the second spatial relation indication is to be used for a limited duration; and means for using the received indications for receiving and/or transmitting signalling with at the least one access node.

The apparatus may comprise means for determining a secondary spatial relation for at least one transmission to be made in the second direction; and means for using the determined secondary spatial relation for said at least one transmission after using said second spatial relation.

The apparatus may comprise means for receiving a fourth indication from the at least one access node that indicates whether the second spatial relation indication is to be applied to transmissions made in the second direction on resources that are part of the same resource group as a resource on which the second transmission is made.

The apparatus may comprise means for receiving a fifth indication from the at least one access node, wherein the fifth indication indicates a third spatial relation indication to be used for a third transmission in the second direction.

When the third indication indicates that the second spatial relation indication is to be used for a limited duration, the apparatus may comprise means for receiving a sixth indication that indicates a number of transmissions to be made using the second spatial relation indication and/or the first spatial relation indication, wherein the means for using the received indications comprises using the second spatial relation indication and/or the first spatial relation indication for said limited duration.

When the third indication indicates that the second spatial relation indication is to be used for a limited duration, the apparatus may comprise means for receiving a sixth indication that indicates a duration in time for using the second spatial relation indication and/or the first spatial relation indication, wherein the means for using the received indications comprises using the second spatial relation indication and/or the first spatial relation indication for said limited duration.

Said second indication may further indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the apparatus may comprise means for using a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a second aspect, there is provided an apparatus for an access node, comprising: means for transmitting to a terminal a first spatial relation indication for a first transmission to be made in a first direction; means for transmitting to the terminal a second spatial relation indication for a second transmission to be made in a second direction; means for transmitting to the terminal a third indication indicating whether the second spatial relation indication is to be used for a limited duration; and means for using the transmitted indications for receiving and/or transmitting signalling with the terminal.

The apparatus may comprise means for determining a secondary spatial relation for at least one transmission to be made in the second direction; and means for using the determined secondary spatial relation for said at least one transmission after using said second spatial relation.

The apparatus may comprise means for transmitting a fourth indication from the at least one access node that indicates whether the second spatial relation indication is to be applied to transmissions made in the second direction on resources that are part of the same resource group as a resource on which the second transmission is made.

The apparatus may comprise means for transmitting a fifth indication to the terminal that indicates a third spatial relation to be used for a third transmission in the second direction.

When the third indication indicates that the second spatial relation indication is to be used for a limited duration, the apparatus may comprise means for transmitting a sixth indication that indicates a number of transmissions to be made using the second spatial relation indication and/or the first spatial relation indication, wherein the means for using the received indications comprises using the second spatial relation indication and/or the first spatial relation indication for said limited duration.

When the third indication indicates that the second spatial relation indication is to be used for a limited duration, the apparatus may comprise means for transmitting a sixth indication that indicates a duration in time for using the second spatial relation indication and/or the first spatial relation indication, wherein the means for using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the apparatus may comprise means for using a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a third aspect, there is provided a method for an apparatus for a terminal, the method comprising: receiving from at least one access node a first spatial relation indication for a first transmission to be made in a first direction; receiving from the at least one access node a second spatial relation indication for a second transmission to be made in a second direction; receiving from the at least one access node a third indication indicating whether the second spatial relation indication is to be used for a limited duration; and using the received indications for receiving and/or transmitting signalling with at the least one access node.

The method may comprise determining a secondary spatial relation for at least one transmission to be made in the second direction; and using the determined secondary spatial relation for said at least one transmission after using said second spatial relation.

The method may comprise receiving a fourth indication from the at least one access node that indicates whether the second spatial relation indication is to be applied to transmissions made in the second direction on resources that are part of the same resource group as a resource on which the second transmission is made.

The method may comprise receiving a fifth indication from the at least one access node, wherein the fifth indication indicates a third spatial relation indication to be used for a third transmission in the second direction.

When the third indication indicates that the second spatial relation indication is to be used for a limited duration, the method may comprise receiving a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the method may comprise receiving a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the method may comprise using a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a fourth aspect, there is provided a method for an apparatus for an access node, the method comprising: transmitting to a terminal a first spatial relation indication for a first transmission to be made in a first direction; transmitting to the terminal a second spatial relation indication for a second transmission to be made in a second direction; transmitting to the terminal a third indication indicating whether the second spatial relation indication is to be used for a limited duration; and using the transmitted indications for receiving and/or transmitting signalling with the terminal.

The method may comprise determining a secondary spatial relation for at least one transmission to be made in the second direction; and using the determined secondary spatial relation for said at least one transmission after using said second spatial relation.

The method may comprise transmitting a fourth indication from the at least one access node that indicates whether the second spatial relation indication is to be applied to transmissions made in the second direction on resources that are part of the same resource group as a resource on which the second transmission is made.

The method may comprise transmitting a fifth indication to the terminal that indicates a third spatial relation to be used for a third transmission in the second direction.

When the third indication indicates that the second spatial relation indication is to be used for a limited duration, the method may comprise transmitting a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the method may comprise transmitting a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the method may comprise using a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a fifth aspect, there is provided an apparatus for a terminal, the apparatus comprising at least one processor and at least one memory comprising computer code that, when run on the at least one processor, causes the terminal to: receive from at least one access node a first spatial relation indication for a first transmission to be made in a first direction; receive from the at least one access node a second spatial relation indication for a second transmission to be made in a second direction; receive from the at least one access node a third indication indicating whether the second spatial relation indication is to be used for a limited duration; and use the received indications for receiving and/or transmitting signalling with at the least one access node.

The terminal may be caused to determine a secondary spatial relation for at least one transmission to be made in the second direction; and use the determined secondary spatial relation for said at least one transmission after using said second spatial relation.

The terminal may be caused to receive a fourth indication from the at least one access node that indicates whether the second spatial relation indication is to be applied to transmissions made in the second direction on resources that are part of the same resource group as a resource on which the second transmission is made.

The terminal may be caused to receive a fifth indication from the at least one access node, wherein the fifth indication indicates a third spatial relation indication to be used for a third transmission in the second direction.

When the third indication indicates that the second spatial relation indication is to be used for a limited duration, the terminal may be caused to receive a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the terminal may be caused to receive a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the terminal may be caused to use a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a sixth aspect, there is provided an apparatus for an access node, the apparatus comprising at least one processor and at least one memory comprising computer code that, when run on the at least one processor, causes the access node to: transmit to a terminal a first spatial relation indication for a first transmission to be made in a first direction; transmit to the terminal a second spatial relation indication for a second transmission to be made in a second direction; transmit to the terminal a third indication indicating whether the second spatial relation indication is to be used for a limited duration; and use the transmitted indications for receiving and/or transmitting signalling with the terminal.

The access node may be caused to determine a secondary spatial relation for at least one transmission to be made in the second direction; and use the determined secondary spatial relation for said at least one transmission after using said second spatial relation.

The access node may be caused to transmit a fourth indication from the at least one access node that indicates whether the second spatial relation indication is to be applied to transmissions made in the second direction on resources that are part of the same resource group as a resource on which the second transmission is made.

The access node may be caused to transmit a fifth indication to the terminal that indicates a third spatial relation to be used for a third transmission in the second direction.

When the third indication indicates that the second spatial relation indication is to be used for a limited duration, the access node may be caused to transmit a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the access node may be caused to transmit a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the access node may be caused to use a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a seventh aspect, there is provided an apparatus for a terminal, comprising: receiving circuitry for receiving from at least one access node a first spatial relation indication for a first transmission to be made in a first direction; receiving circuitry for receiving from the at least one access node a second spatial relation indication for a second transmission to be made in a second direction; receiving circuitry for receiving from the at least one access node a third indication indicating whether the second spatial relation indication is to be used for a limited duration; and using circuitry for using the received indications for receiving and/or transmitting signalling with at the least one access node.

The apparatus may comprise determining circuitry for determining a secondary spatial relation for at least one transmission to be made in the second direction; and using circuitry for using the determined secondary spatial relation for said at least one transmission after using said second spatial relation.

The apparatus may comprise receiving circuitry for receiving a fourth indication from the at least one access node that indicates whether the second spatial relation indication is to be applied to transmissions made in the second direction on resources that are part of the same resource group as a resource on which the second transmission is made.

The apparatus may comprise receiving circuitry for receiving a fifth indication from the at least one access node, wherein the fifth indication indicates a third spatial relation indication to be used for a third transmission in the second direction.

When the third indication indicates that the second spatial relation indication is to be used for a limited duration, the apparatus may comprise receiving circuitry for receiving a sixth indication that indicates a number of transmissions to be made using the second spatial relation indication and/or the first spatial relation indication, wherein the using circuitry for using the received indications comprises using the second spatial relation indication and/or the first spatial relation indication for said limited duration.

When the third indication indicates that the second spatial relation indication is to be used for a limited duration, the apparatus may comprise receiving circuitry for receiving a sixth indication that indicates a duration in time for using the second spatial relation indication and/or the first spatial relation indication, wherein the using circuitry for using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the apparatus may comprise using circuitry for using a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to an eighth aspect, there is provided an apparatus for an access node, comprising: transmitting circuitry for transmitting to a terminal a first spatial relation indication for a first transmission to be made in a first direction; transmitting circuitry for transmitting to the terminal a second spatial relation indication for a second transmission to be made in a second direction; transmitting circuitry for transmitting to the terminal a third indication indicating whether the second spatial relation indication is to be used for a limited duration; and using circuitry for using the transmitted indications for receiving and/or transmitting signalling with the terminal.

The apparatus may comprise determining circuitry for determining a secondary spatial relation for at least one transmission to be made in the second direction; and using circuitry for using the determined secondary spatial relation for said at least one transmission after using said second spatial relation.

The apparatus may comprise transmitting circuitry for transmitting a fourth indication from the at least one access node that indicates whether the second spatial relation indication is to be applied to transmissions made in the second direction on resources that are part of the same resource group as a resource on which the second transmission is made.

The apparatus may comprise transmitting circuitry for transmitting a fifth indication to the terminal that indicates a third spatial relation to be used for a third transmission in the second direction.

When the third indication indicates that the second spatial relation indication is to be used for a limited duration, the apparatus may comprise transmitting circuitry for transmitting a sixth indication that indicates a number of transmissions to be made using the second spatial relation indication and/or the first spatial relation indication, wherein the using circuitry for using the received indications comprises using the second spatial relation indication and/or the first spatial relation indication for said limited duration.

When the third indication indicates that the second spatial relation indication is to be used for a limited duration, the apparatus may comprise transmitting circuitry for transmitting a sixth indication that indicates a duration in time for using the second spatial relation indication and/or the first spatial relation indication, wherein the using circuitry for using the received indications comprises using the second spatial relation indication and/or the first spatial relation indication for said limited duration.

Said second indication may further indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the apparatus may comprise using circuitry for using a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a ninth aspect, there is provided non-transitory computer readable medium comprising program instructions for causing an apparatus of a terminal to perform at least the following: receive from at least one access node a first spatial relation indication for a first transmission to be made in a first direction; receive from the at least one access node a second spatial relation indication for a second transmission to be made in a second direction; receive from the at least one access node a third indication indicating whether the second spatial relation indication is to be used for a limited duration; and use the received indications for receiving and/or transmitting signalling with at the least one access node.

The terminal may be caused to determine a secondary spatial relation for at least one transmission to be made in the second direction; and use the determined secondary spatial relation for said at least one transmission after using said second spatial relation.

The terminal may be caused to receive a fourth indication from the at least one access node that indicates whether the second spatial relation indication is to be applied to transmissions made in the second direction on resources that are part of the same resource group as a resource on which the second transmission is made.

The terminal may be caused to receive a fifth indication from the at least one access node, wherein the fifth indication indicates a third spatial relation indication to be used for a third transmission in the second direction.

When the third indication indicates that the second spatial relation indication is to be used for a limited duration, the terminal may be caused to receive a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the terminal may be caused to receive a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the terminal may be caused to use a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to a tenth aspect, aspect, there is provided non-transitory computer readable medium comprising program instructions for causing an apparatus of an access node to perform at least the following: transmit to a terminal a first spatial relation indication for a first transmission to be made in a first direction; transmit to the terminal a second spatial relation indication for a second transmission to be made in a second direction; transmit to the terminal a third indication indicating whether the second spatial relation indication is to be used for a limited duration; and use the transmitted indications for receiving and/or transmitting signalling with the terminal.

The access node may be caused to determine a secondary spatial relation for at least one transmission to be made in the second direction; and use the determined secondary spatial relation for said at least one transmission after using said second spatial relation.

The access node may be caused to transmit a fourth indication from the at least one access node that indicates whether the second spatial relation indication is to be applied to transmissions made in the second direction on resources that are part of the same resource group as a resource on which the second transmission is made.

The access node may be caused to transmit a fifth indication to the terminal that indicates a third spatial relation to be used for a third transmission in the second direction.

When the third indication indicates that the second spatial relation indication is to be used for a limited duration, the access node may be caused to transmit a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the access node may be caused to transmit a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration.

When the third indication indicates that the second spatial relation indication is to be used for a limited duration, the access node may be caused to use a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

According to an eleventh aspect, there is provided an electronic device that may comprise apparatus as described herein.

According to a twelfth aspect, there is provided a chipset that may comprise an apparatus as described herein.

According to a thirteenth aspect, there is provided a computer program comprising program instructions for causing a computer to perform any method as described above.

According to a fourteenth aspect, there is provided a computer program product stored on a medium may cause an apparatus to perform any method as described herein.

BRIEF DESCRIPTION OF FIGURES

Examples will now be described, by way of example only, with reference to the accompanying Figures in which.

DETAILED DESCRIPTION

In the following, certain examples are explained with reference to mobile communication devices capable of communication via a wireless cellular system and mobile communication systems serving such mobile communication devices. Before explaining in detail the exemplifying mechanisms, certain general principles of a 5G wireless communication system are briefly explained with reference to FIG. 1.

Figure 1:
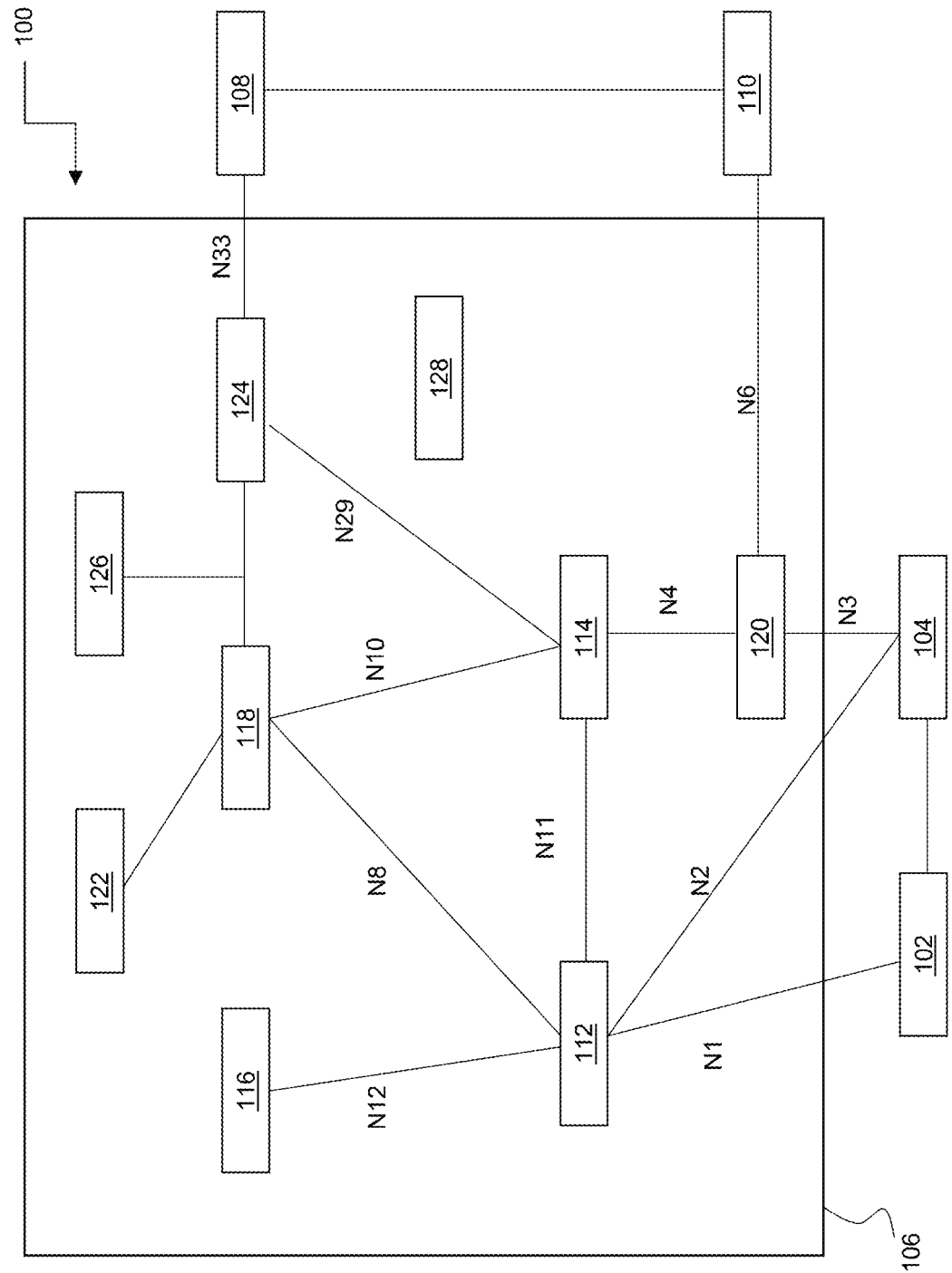
FIG. 1 shows a schematic representation of a 5G system.

FIG. 1 shows a schematic representation of a 5G system (5GS) 100. The 5GS may comprise a user equipment (UE) 102 (which may also be referred to as a communication device or a terminal), a 5G access network (AN) (which may be a 5G Radio Access Network (RAN) or any other type of 5G AN such as a Non-3GPP Interworking Function (N3IWF)/a Trusted Non3GPP Gateway Function (TNGF) for Untrusted/Trusted Non-3GPP access or Wireline Access Gateway Function (W-AGF) for Wireline access) 104, a 5G core (5GC) 106, one or more application functions (AF) 108 and one or more data networks (DN) 110.

The 5G RAN may comprise one or more gNodeB (gNB) distributed unit functions connected to one or more gNodeB (gNB) centralized unit functions. The RAN may comprise one or more access nodes.

The 5GC 106 may comprise one or more access management functions (AMF) 112, one or more session management functions (SMF) 114, one or more authentication server functions (AUSF) 116, one or more unified data management (UDM) functions 118, one or more user plane functions (UPF) 120, one or more unified data repository (UDR) functions 122, one or more policy control functions (PCF) 128, and/or one or more network exposure functions (NEF) 124. Although PCF 128 is not depicted with its interfaces, it is understood that this is for clarity reasons and that PCF 128 may have a plurality of interfaces with other network functions, such as AMF 112 (via interface N15), SMF 114 (via interface N7), UDR 122 (through interface N36), network data analytics function (NWDAF) 126 (through interface N23), and many other network functions.

The 5GC 106 also comprises a network data analytics function (NWDAF) 126. The NWDAF is responsible for providing network analytics information upon request from one or more network functions or apparatus within the network. Network functions can also subscribe to the NWDAF 126 to receive information therefrom. Accordingly, the NWDAF 126 is also configured to receive and store network information from one or more network functions or apparatus within the network. The data collection by the NWDAF 126 may be performed based on at least one subscription to the events provided by the at least one network function.

Apparatuses performing transmit and/or receive operations may transmit and/or receive using multiple antenna ports. It has been found that, in some cases, two (or more) different physical antenna ports mapped to two different channels may exhibit one or more of the same/common radio channel characteristics. This means that if, for example, one of the channels suffers from doppler spread, the other associated channel also suffers from doppler spread. Examples of radio channel characteristics that can be common across different antenna ports include: Doppler Shift, Doppler Spread, Average Delay, Delay Spread, and Spatial Receiver Parameters. When such antenna ports are paired by such radio conditions, a UE/receiving entity can decode one signal using knowledge it gathered after decoding the other signal. Such antenna ports (i.e. having at least one common radio channel characteristic) are said to be quasi co-located (QCL).

A parameter known as a Transmission Configuration Indicator (TCI) State may be used to signal which channels/antenna ports are QCL and thus have similar transmit and/or receive processing performed on them. A TCI state may therefore be said to indicate a spatial relationship between at least two channels and/or between at least two ports. For example, QCL-relationships between downlink reference signals in one Channel State Information (CSI)-reference signal set and the Physical Downlink Shared Channel (PDSCH) Demodulation Reference (DMRS) signal ports may be indicated using a TCI state. TCI states may be dynamically sent to a UE from a network using a Downlink Control Information message. A UE may be configured with a list of up to "M" TCI-State configurations by the network, where M depends on the UE capability.

The TCI state may thus be considered to be a container that comprises QCL source reference signal(s) from which a UE extracts and/or extrapolates spatial source characteristics to assist the UE in setting its receive beam properly for the downlink reception. Similarly, a generic signalled spatial relation carries a reference signal that may be used as a spatial source to indicate to a UE how to set its transmit beam for the uplink transmission.

As spatial information such as a TCI state is used in receive processing, it is useful to be able to flexibly and/or quickly update spatial information when it changes. Current specified ways for TCI state or spatial relation information update/indication for downlink and uplink channels rely on different operations with different capabilities. The operations of TCI state/spatial relation information signalling that are defined in Rel-15 New Radio and Rel-16 New Radio are briefly described below for some channels.

First, the configuration and/or activation of uplink TCI states is considered. The Physical Uplink Control Channel (PUCCH) can have a variety of different spatial relation information configured via Radio Resource Control (RRC) signalling. For example, selection and activation of a spatial relation may be performed via a Medium Access Control (MAC) Control Element (CE) in the signalled message. In Rel-15 the spatial relation update using MAC CE (e.g. beam switch) is signalled per PUCCH resource. Rel-16 introduced the possibility of having a simultaneous update of a spatial relation per group of PUCCH resources by using one MAC CE, with a UE having up to four configured groups of PUCCH resource.

An Aperiodic Sounding-Reference Signal (A-SRS) for a UE to transmit an uplink signal for a network to measure uplink properties was also introduced in these specifications. The specific resource(s) on which this is signalled may be indicated using a MAC CE based spatial relation update for aperiodic SRS per resource level.

Second, the activation and/or configuration of downlink TCI states is considered. The Downlink Control Information (DCI), which is carried on the PDCCH, has a 3-bit field that may be used for selecting a certain TCI state of the activated TCI states for PDSCH beam indication. In general, the DCI may be used to indicate the resource assignment in uplink or downlink for one Radio Network Temporary Identifier. For this, and throughout the following, a resource refers to a unit defined by reference to a particular time and frequency. The resource may be assignable, as per the above. As an extension to this, a CORESET refers to a time and frequency allocation for the PDCCH, and is generalised to a set of resource blocks and OFDM symbols. A DCI can thus convey various pieces of information, but the useful content depends on the specific case of system deployment or operations.

For the Physical Downlink Shared Channel (PDSCH), a MAC-CE may be used to activate a maximum of 8 TCI states.

Each CORESET for a UE may be configured with up to K TCI states for the Physical Downlink Control Channel (PDCCH), before MAC-CE signalling is used to indicate which TCI state is to be used.

Recent agreements have been made on the scope of Rel-17 for enhancements to multi-beam operation.

One key objective in these agreements is to improve latency and efficiency of communications through more usage of dynamic control signalling. Hence, in a similar way as for the PDSCH, Layer 1 signalling would be used for indicating a TCI state/spatial relation for uplink channels, such as PUCCH, SRS, etc., as well as for downlink channels.

Another agreed objective is to enable a unified/common TCI framework for downlink and uplink beam indication. Thus, the framework of spatial relation, which was introduced in Rel-15, would eventually be replaced by the present TCI framework, or at least the latter framework would need to be added on top of the former one. The term TCI state could then be used to refer to (or to replace) spatial relation information; or even to refer to SRS resource indicator (SRI). However, for clarity in the following, the phrase "spatial relation indication" or the like will also be understood to encompass TCI state information (or simply "TCI"), SRI, beam information, and/or spatial filter information, unless explicitly indicated otherwise. More generally, all these terms may be used interchangeably.

One of the scenarios in which the latency and flexibility aspects of TCI state indication would be useful is when an uplink transmission is triggered by, or is in response to a downlink transmission, and vice versa. This is particularly the case for those transmissions associated to some high-priority traffic such as Ultra Reliable Low Latency Communications. One example of such a scenario is a PUCCH carrying an acknowledgement (such as a Hybrid Automatic Repeat Request (HARQ) acknowledgement) in response to reception on a PDSCH. Another example is the transmission of an explicit downlink HARQ-ACK in response to uplink transmission, such as configured grant (CG)/Semi-Persistently-Scheduled (SPS) PUSCH.

As previously explained, currently it's not possible to indicate TCI states (or other types of spatial relation information) for uplink channels such as PUCCH via Layer 1 signalling (i.e. at the physical layer). However, such a mechanism would be useful to enable a faster beam indication/update, particularly if it is suitable for the envisaged common TCI framework.

It's also to be noted that multiple transmission and reception point (multi-TRP) scenarios are also expected to feature in future communication protocols. In such cases, multiple TRPs (e.g. macro-cells, small cells, pico-cells, femto-cells, remote radio heads, relay nodes, etc) may be used to effect a communication to and/or from a UE. For example, a UE may have candidate beam pair links to multiple TRPs in downlink and/or uplink for robustness against blockages, and for scheduling flexibility and low latency. Therefore, spatial information for transmissions made in both directions would be useful.

With the expected Layer 1 signalling to be also used for an uplink TCI state indication, it's currently unclear how such a feature would interact with the current downlink TCI indication for downlink transmissions. This has an impact in terms of downlink control overhead.

On the other hand, the current procedures for indicating spatial relation information (such as TCI state) for PUCCH via a MAC CE suffers from limited flexibility. For example, when spatial relation information is indicated for a PUCCH resource(s) (identified by a PUCCH resource index), the UE may apply this same spatial relation for any PUCCH transmission that uses that PUCCH resource until a further update of the spatial relation for that resource is received. However, this can significantly limit the flexibility in scenarios where a temporary spatial relation update/indication (e.g. for only one transmission) of spatial relation would be needed. For instance, such a temporary update is beneficial for at least the following cases: (i) bidirectional TCI states indication is configured, (ii) multi-TRP operation where the network wants to offload some uplink transmissions to a second TRP, or wants to allow only some important uplink transmissions towards a specific TRP, (iii) temporary MPE (maximum permissible exposure) event affecting some spatial relation(s), (iv) network is aware of temporary blockage affecting some spatial relation(s).

In addition, if the PUCCH resource belongs to one of the RRC-configured PUCCH resource groups, currently a spatial relation update of any resource in the corresponding group leads to a same update for the other PUCCH resources in the group. This is another limitation of the current procedures.

Based on the above discussion and observations, the following focuses on the provision of at least one mechanism for enabling a flexible and fast bidirectional TCI states indication.

The present mechanisms will be illustrated with respect to several examples, before a more general discussion of those examples is presented.

Figure 5:
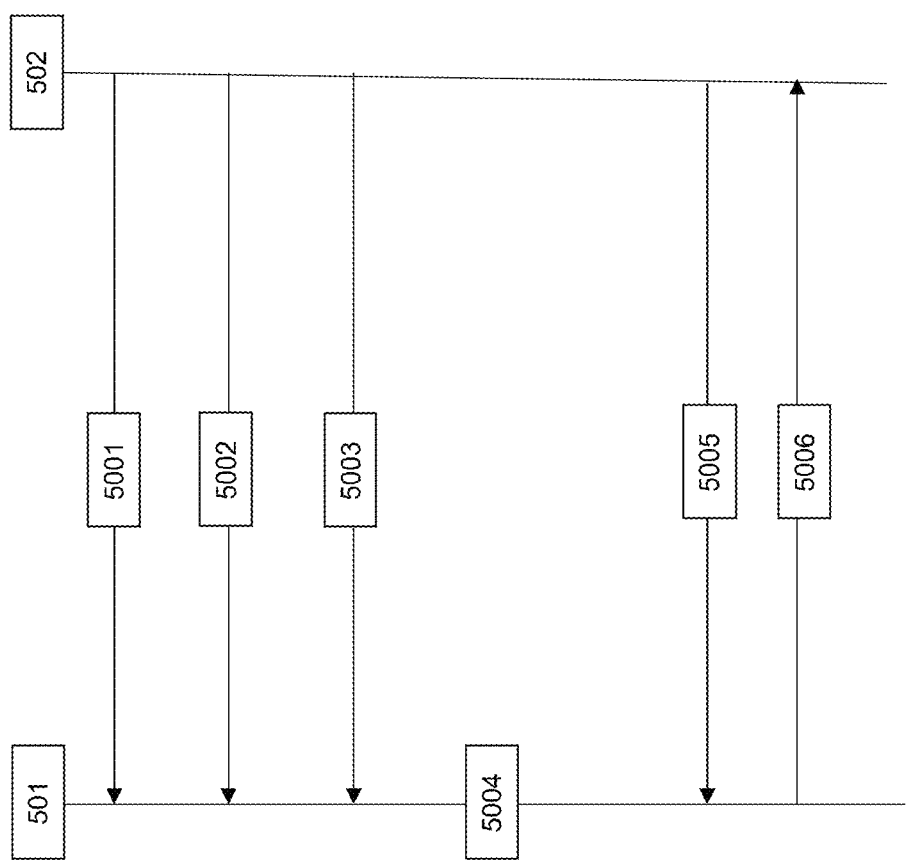
FIG. 5 shows example signalling between a UE and a network apparatus.

FIG. 5 is a signalling diagram illustrating potential signals exchanged between a UE 501 and a network 502. The network 502 may represent at least one network entity communicating with the UE 501, such as an access node.

At 5001, the network 502 signals the UE 501. This signalling configures the UE with a set of downlink and uplink TCI states. At least some of the downlink and uplink TCI states are paired. This means that at least one downlink TCI state is paired with at least one uplink TCI state.

At 5002, the network 502 signals the UE 501. This signalling activates at least one of the paired downlink and uplink TCI states.

At 5003, the network 502 signals the UE 501. This signalling indicates a TCI codepoint that corresponds to a downlink TCI state and to an uplink TCI state, where a TCI codepoint is a single label for referring to a downlink TCI and uplink TCI combination. For example, when the uplink and downlink TCI states are individually configured, a TCI codepoint may refer to a pair of uplink and downlink TCI states, such that both are indicated by the same codepoint. As another example, when the same TCI state is to be used for uplink and downlink, the TCI codepoint may refer to one TCI state that is common for both downlink and uplink. In general, a codepoint is a character encoding standard for computer storage and transmission of the letters, characters, and symbols of most languages and writing systems.

This signalling further indicates whether at least one of the TCI state updates is temporary or not.

At 5004, the UE 501 determines the downlink receive TCI state(s) and the uplink transmission TCI state(s) for the indicated/configured resources, and further determines whether or not the TCI state update is temporary.

At 5005, the network 502 makes at least one downlink transmission to the UE 501 on the indicated downlink receive TCI state(s). The UE 501 may receive this transmission on the indicated downlink receive TCI state(s)

At 5006, the UE 501 makes at least one uplink transmission to the network 502 on the indicated uplink transmission TCI state(s). The network 502 may receive this transmission on the indicated uplink transmission TCI state(s).

Figure 6:
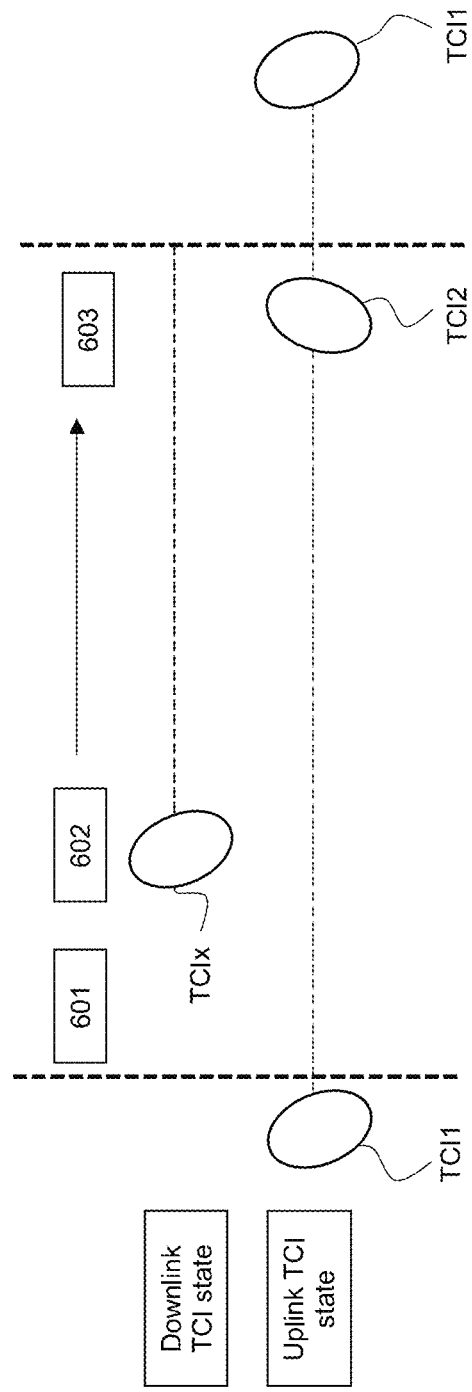
FIG. 6 shows example TCI states that may be used for controlling transmissions and/or reception.

FIG. 6 illustrates mechanisms related to temporary bidirectional TCI state updates/indications.

FIG. 6 shows a signalling in time that may be provided between a UE and a network. The signalling comprises a DCI part 601. The DCI part may comprise a codepoint corresponding to a paired downlink TCI state and an uplink TCI state. The DCI part 601 may comprise an indication to apply a temporary update of uplink TCI e.g. for a single transmission.

At 602, there is signalling from the network to the UE on the Physical Downlink Shared Channel using the indicated downlink TCI state provided in 601. In other words, the network may transmit to the UE using the indicated downlink TCI state provided in 601.

At 603, there is signalling from the UE to the network on the Physical Uplink Control Channel using the indicated uplink TCI state signalled at 601. This signalling may form at least part of a HARQ acknowledgment for the downlink data received by the UE during 602. When the time for using this indicated uplink TCI state has expired (e.g. as it is temporary), the uplink TCI state may revert to a TCI state used immediately prior to the temporary indicated uplink TCI state was used.

In this example, an uplink transmission is provided in response to a downlink transmission, where there is a PDSCH transmission and a PUCCH carrying HARQ-acknowledgement feedback corresponding to that PDSCH. After the network has activated a number of paired downlink receive and uplink transmit TCI states, the network indicates via DCI (sent, e.g., on a PDCCH) a codepoint that corresponds to a downlink receive TCI state and an uplink transmission TCI state. These TCI states may then be used by the UE for the PDSCH reception and PUCCH transmission, respectively.

The network also indicates via the DCI to the UE that the indicated uplink TCI state for the indicated/configured PUCCH resource (identified by a PUCCH resource index) is a temporary update. The indication on whether the TCI update applies temporarily or more permanently (until a further update) may be done explicitly. For example, the indication of the change being a temporary update may be explicitly conveyed using, for example, a 1-bit field (such as a flag) in the DCI. The UE may then use the indicated uplink transmission TCI state only for a configured number and/or for a configured duration of PUCCH transmissions on the corresponding indicated/configured PUCCH resource.

After this configured number/predetermined duration of uplink PUCCH transmissions, the UE may return to using the previously used uplink transmission TCI state information for this resource (i.e. an uplink transmission TCI state used before the temporary indicated uplink TCI states were used). In the present example, the number is equal to one transmission. In other words, in the present example, the temporary update signalled at 601 applies to only one PUCCH transmission on the corresponding PUCCH resource. It is understood that other numbers of PUCCH transmissions may be specified. It is further understood that, as an alternative to using a number of transmissions, a timer or a period of time such as a number of transmission timeslots may be configured during which the temporary update applies. In general, the timer, unit of transmission time and/or number of transmissions may all be said to indicate a duration for which a signalled/indicated uplink TCI state is to be applied.

The use of such a temporary TCI state update and the flexibility offered by this operation can be beneficial in several scenarios such as multi-TRP operation, temporary MPE Event, temporary blockages in the network, etc.

Figure 7:
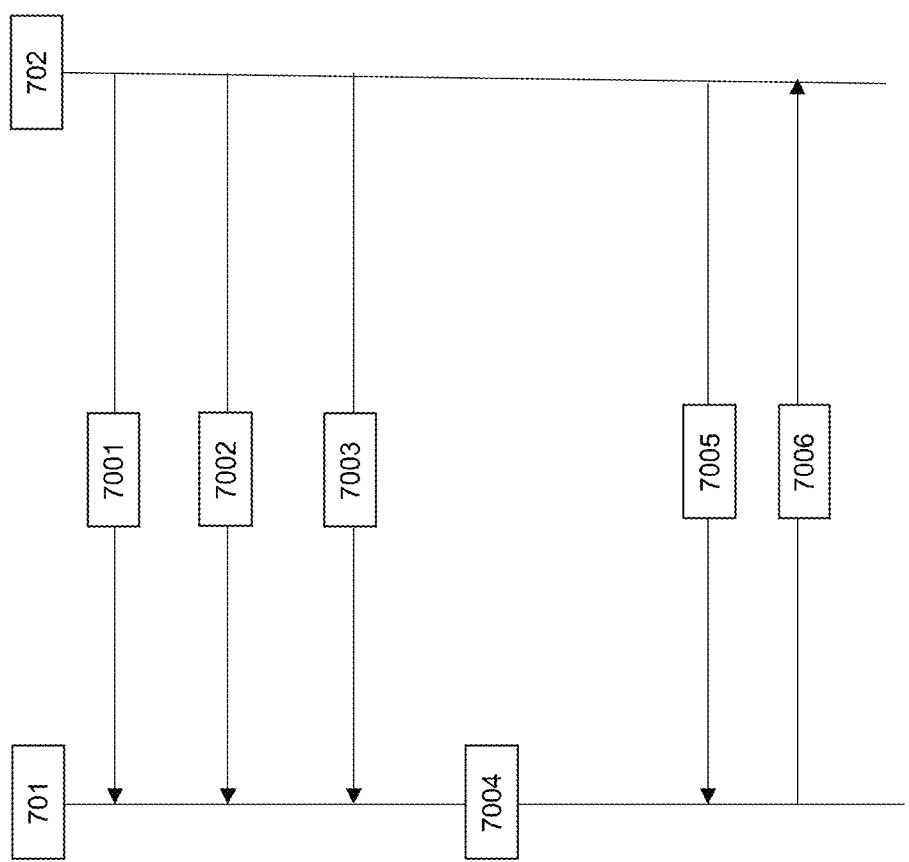
FIG. 7 shows example signalling between a UE and a network apparatus.

FIG. 7 shows another example signalling mechanism. In this example, signals are sent between a UE 701 and a network 702. The network 702 may represent a single network entity, such as an access node. The network 702 may represent multiple network entities, such as multiple access nodes.

At 7001, the network 702 signals the UE 701. This signal configures the UE 701 with a set of downlink and uplink TCI states.

At 7002, the network 702 signals the UE 701. This signal activates at least a portion of the downlink and uplink TCI states configured at 7001. The portion may be less than all of the set of downlink and uplink TCI states configured at 7001. The portion may be all of the set of downlink and uplink TCI states configured at 7001.

At 7003, the network 702 signals the UE 701. This signal indicates a downlink receive TCI state, whether the uplink TCI transmission state is the same as the indicated downlink receive TCI state, and whether the uplink transmission TCI state is temporary or not.

At 7004, the UE 701 determines the downlink receive TCI states and the uplink transmission TCI states for the indicated/configured resources. The UE 701 may also determine whether or not the uplink transmission TCI state is temporary or not.

At 7005, the network 702 signals/transmits to the UE 701 using the indicated downlink TCI state(s) of 7003 (which has been activated at 7002).

At 7006, the UE 701 signals/transmits to the network 702 using the indicated uplink transmission TCI state(s) of 7003.

Figure 8:
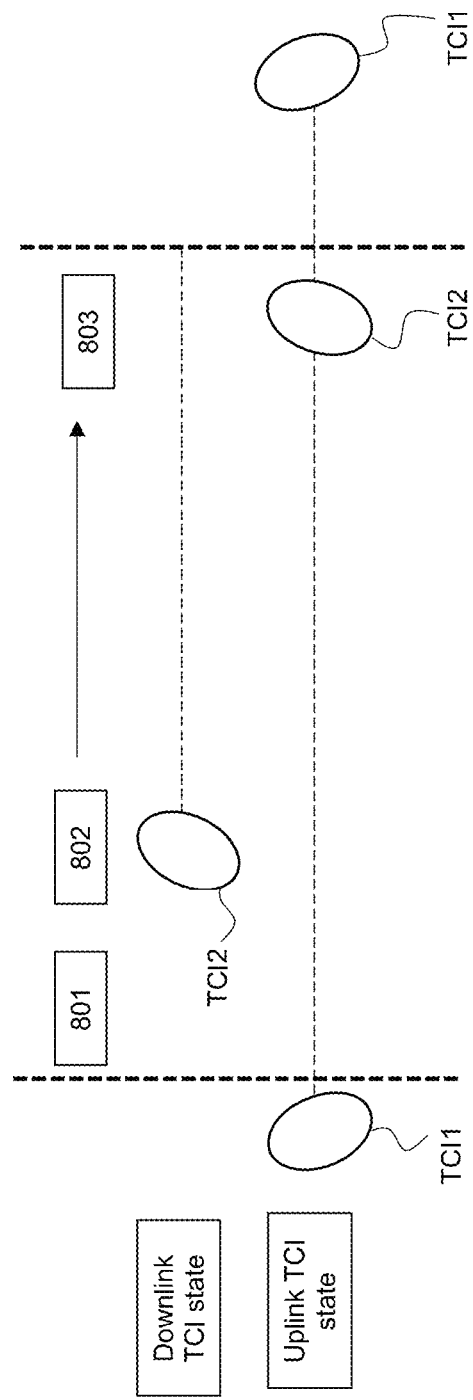
FIG. 8 shows example TCI states that may be used for controlling transmissions and/or reception.

FIG. 8 illustrates mechanisms related to temporary bidirectional TCI state updates/indications.

FIG. 8 shows a signalling in time that may be provided between a UE and a network. The signalling comprises a DCI part 801. The DCI part may comprise an indication of a downlink TCI state. The DCI part 801 may comprise an indication that an uplink transmission TCI state is the same as the indicated downlink receive TCI state. The DCI part 801 may comprise an indication to apply a temporary update of uplink TCI e.g. for a single transmission.

At 802, there is signalling/transmission from the network to the UE on the Physical Downlink Shared Channel using the indicated downlink TCI state.

At 803, there is signalling from the UE to the network on the Physical Uplink Control Channel (e.g. as part of a HARQ acknowledgment) using the indicated uplink TCI state. When the time for using this indicated uplink TCI state has expired (e.g. as it is temporary), the uplink TCI state may revert to a TCI state used immediately prior to the temporary indicated uplink TCI state was used.

This example considers a scenario that is similar to the scenario used in the example of FIG. 6. In the example of FIG. 8, the network indicates (e.g. via DCI sent on a PDCCH) a downlink Rx TCI state to be used by the UE for the PDSCH reception.

The network may indicate (e.g. via the same DCI) that an uplink transmission TCI state is the same as the indicated downlink receive TCI state. In other words, the UE may use this indication as an instruction to use the downlink TCI state for the PDSCH also for the transmission of PUCCH. In general, the indication of whether the downlink receive TCI state may also be used for the uplink transmission TCI state, or whether an existing uplink transmission TCI state used immediately prior to receiving these indications may be used for the uplink transmission, can be signalled to the UE. This signalling may be accomplished in a number of different ways. For example, this signalling of which uplink TCI state to use (i.e. the same as a newly indicated downlink PDSCH TCI state or the same as a currently used uplink TCI state) may be signalled using a 1-bit field in the DCI.

When the same uplink and downlink TCI states are to be used, the network may also indicate to the UE that the indicated uplink Tx TCI state for the indicated/configured PUCCH resource (identified by a PUCCH resource index), using which the HARQ-ACK transmission will be done, is a temporary update/indication. This may be as described in respect of FIG. 6. For example, the signalling may be performed by sending the UE an indication in the DCI that the newly indicated uplink TCI state is temporary.

The UE may use the determined uplink Tx TCI state only for a configured number of PUCCH transmissions resource. The network also indicates via the DCI to the UE that the indicated uplink TCI state for the indicated/configured PUCCH resource (identified by a PUCCH resource index) is a temporary update. The indication on whether temporary update applies or not could be done explicitly. For example, the indication of the change being a temporary update may be explicitly conveyed using, for example, a 1-bit field (such as a flag) in the DCI. The UE may then use the indicated uplink transmission TCI state only for a configured number and/or for a configured duration of PUCCH transmissions on the corresponding indicated/configured PUCCH resource.

After this configured number/predetermined duration of uplink PUCCH transmissions, the UE may return to using the previously used uplink transmission TCI state information for this resource (i.e. an uplink transmission TCI state used before the temporary indicated uplink TCI states were used). In the present example, the number is equal to one transmission, i.e. temporary update applies to only one PUCCH transmission on the corresponding PUCCH resource. It is understood that other numbers of PUCCH transmissions may be specified. It is further understood that, as an alternative to using a number of transmissions, a timer or a period of time may be configured during which the temporary update applies.

The above examples showcase the large flexibility enabled by the presently described mechanisms. An additional aspect to further increase this flexibility is to allow the network to control whether the indicated TCI state for a PUCCH resource that belongs to a configured PUCCH resource group should be applied to the whole group or only to that resource.

As previously explained, such flexibility could be beneficial in several scenarios such as multi-TRP, MPE event, blockage, etc. Furthermore, the proposed solutions clearly bring benefits in terms of efficiency and latency of the TCI state indication mechanism.

The presently described mechanisms are also useful for scenarios in which a transmission in one direction (uplink or downlink) is in response to another transmission in the other direction (downlink or uplink respectively), such as PUCCH carrying HARQ-ACK in response to PDSCH(s). Indeed, for high priority scenarios, the presently described mechanisms can be used to enable an efficient and fast bidirectional TCI states indication.

It is further noted that all the examples provided could be modified and adapted to the case where there is a downlink transmission(s) in response to an uplink transmission(s), such as downlink HARQ acknowledgment (e.g. on a specific physical downlink control channel (PDCCH)) in response to a Physical Uplink Shared Channel (PUSCH) repetition operation.

For example, in the case of unlicensed operation, a transmitting device such as a gNB may acquire a channel and allocation that can be used by the transmitting device on the downlink and a receiving device (e.g. a UE) on the uplink. This is a type of shared channel occupancy time, during which there can be one or multiple downlink and uplink timing units. In that use case, a TCI state indicated to be used for the downlink transmission in the downlink portion for the UE may be used as a spatial source for the UE's uplink transmission within the same shared channel occupancy time (COT), when an uplink timing unit follows a downlink timing unit.

In the above, a network activates a number of downlink reception and uplink transmission TCI states at a UE. This activation may be performed via a number of different signalling mechanisms, including using a Medium Access Control Control element and by an indication sent in the Downlink Control Information.

Some of the downlink TCI states and uplink TCI states may be paired, such that a TCI codepoint corresponds to a downlink receive TCI state and an uplink transmit TCI state. In such a case, signalling using a single TCI codepoint would indicate both a downlink receive TCI state and a uplink transmit TCI state to be activated. As another example, the same activated TCI states may be used for both downlink receive TCI state and a uplink transmit TCI state. In such a case, signalling using a single TCI codepoint would indicate both a downlink receive TCI state and an uplink transmit TCI state, both of these TCI states being the same. Thus, in both of these example cases, the network may then signal to the UE one codepoint that corresponds to one downlink receive TCI state and one uplink transmit TCI state. This signalling may be performed using the Downlink Control Information signalling. As another example case, the network may signal one downlink receive TCI state and one uplink transmit TCI state using two separate codepoints. This signalling may be performed using Downlink Control Information signalling.

The network may signal both states by explicitly indicating only one of a downlink receive TCI state and an uplink transmit TCI state. In this case, a flag could be used to instruct the UE whether to either use the indicated TCI state of the downlink receive TCI state also for the uplink transmit TCI state, or to use existing uplink TCI state information. This signalling (e.g. of the flag) may be performed using Downlink Control Information signalling. The flag may be, for example, a 1-bit field in the DCI.

The Network may indicate to the UE whether the indicated TCI state for a resource is a temporary update/indication or not. This signalling may be performed using Downlink Control Information signalling. If the indicated TCI state is a temporary update, the UE may use the indicated TCI state(s) only for a configured duration. The duration may be expressed in terms of a number, N, (e.g. N=1) of transmissions on the corresponding indicated/configured resource. As another example, the network may configure the UE with a timer where the temporary indication, if applicable, is valid as long as the timer has not expired. The timer can also be expressed in terms of a number of time slots. The time slots may be defined according to a communication protocol. The UE may be provided with the duration in at least one of a number of different ways. For example, the duration may be signalled to the UE using Downlink Control Information signalling. The duration may be signalled to the UE using a MAC CE. The UE may be configured with the duration via Radio Resource Control signalling.

After the duration has expired (e.g. the number of transmissions has been made, the timer has expired, etc.), the UE may return to using previously used/configured TCI state information for this resource. In other words, the UE may return to a TCI state it had before the indication was received. If a temporary indication was not received, then the UE would use the indicated TCI state for any transmission on the corresponding resource until the TCI state of this resource is updated again.

The Network may also indicate to the UE whether, when an indicated uplink TCI state is a TCI state for a resource that belongs to a configured uplink resource group, the indicated TCI state should also be applied to the whole group or only to that resource. When a TCI state update is indicated to be temporary for the resource and the TCI state applies to the whole resource group (and not just for the resource), the temporary update operation may also be applicable to the whole group, such that the resource group returns to a previous TCI state when the duration expires. This signalling may be performed using Downlink Control Information signalling.

In one example, to enable beam diversity for uplink repetition operations such as PUCCH repetition, the network may send an uplink transmit TCI state using at least one of the proposed methods above. The network may indicate and/or configure the UE to determine a second uplink transmit TCI state. This may be performed using, for example, the existing TCI state for the corresponding PUCCH resource, the indicated downlink receive TCI state, a default TCI state for PUCCH, or any other uplink transmit TCI state configured for such usage. The default TCI could be the TCI of CORESET with lowest ID or generally explicitly defined and configured default TCI state for uplink.

The network may indicate and/or configure the UE to make this determination using, for example, a 1-bit field in the Downlink Control Information that indicates whether to use the existing TCI state for the corresponding PUCCH resource or a default TCI state for the PUCCH. As another example, the network may indicate two uplink transmit TCI states by indicating a codepoint that corresponds to two uplink Tx TCI states. Such a shared codepoint may be configured by the network.

Although the above mostly focuses on configuring the uplink TCI state, it is understood that the proposed mechanisms may be applied for uplink resource(s), downlink resource(s), or both uplink and downlink resources at a same time.

Figure 9:
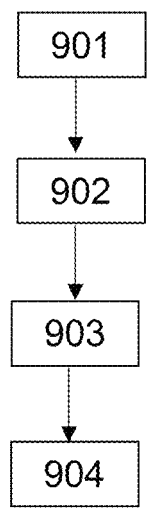
FIGS. 9 and 10 are flow charts showing example operations of described apparatuses.

FIG. 9 is a flow chart illustrating potential operations that may be performed by an apparatus for a terminal. The terminal may be interacting with an access node operating as described below with reference to FIG. 10.

At 901, the terminal receives from at least one access node a first spatial relation indication for a first transmission to be made in a first direction.

At 902, the terminal receives from the at least one access node a second spatial relation indication for a second transmission to be made in a second direction. The first direction may be uplink and the second direction may be downlink. Alternatively, the first direction may be downlink and the second direction may be uplink.

At 903, the terminal receives from the at least one access node a third indication indicating whether the second spatial relation indication is to be used for a limited duration. In other words, the terminal receives from the at least one access node a third indication indicating whether or not the second spatial relation indication is to be used for a limited duration.

At 904, the terminal uses the received indications for receiving and/or transmitting signalling with at the least one access node.

It is understood in the above that the signals/indications received by the terminal from the access node may be sent by an appropriate communication mechanism. For example, the indications may be transmitted to the terminal using DCI. As another example, the indications may be transmitted to the terminal using an RRC-based mechanism. Different indications do not have to be transmitted using the same mechanism. However, it is understood that the different indications can be transmitted using the same mechanism.

The terminal may determine a secondary spatial relation for at least one transmission to be made in the second direction, and use the determined secondary spatial relation for said at least one transmission after using said second spatial relation.

The terminal may receive a fourth indication from the at least one access node that indicates whether the second spatial relation indication is to be applied to transmissions made in the second direction on resources that are part of the same resource group as a resource on which the second transmission is made. In other words, the terminal may receive a fourth indication from the at least one access node that indicates whether or not the second spatial relation indication is to be applied to transmissions made in the second direction on resources that are part of the same resource group as a resource on which the second transmission is made.

The terminal may receive a fifth indication from the at least one access node, wherein the fifth indication indicates a third spatial relation indication to be used for a third transmission in the second direction.

When the third indication indicates that the second spatial relation indication is to be used for a limited duration, the terminal may receive a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, the terminal may receive a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration. In other words, said third indication may further indicate whether or not the first spatial relation indication is to be used for the limited duration.

When the third indication indicates that the second spatial relation indication is to be used for a limited duration, the terminal may use a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

Figure 10:
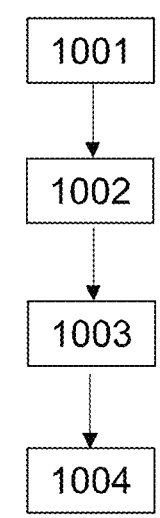

FIG. 10 is a flow chart illustrating potential operations that may be performed by an apparatus for an access node. The access node may be interacting with a terminal operating as described above with reference to FIG. 9.

At 1001, the access node transmits to a terminal a first spatial relation indication for a first transmission to be made in a first direction.

At 1002, the access node transmits to the terminal a second spatial relation indication for a second transmission to be made in a second direction. The first direction may be uplink and the second direction may be downlink. Alternatively, the first direction may be downlink and the second direction may be uplink.

At 1003, the access node transmits to the terminal a third indication indicating whether the second spatial relation indication is to be used for a limited duration. In other words, the access node transmits to the terminal a third indication indicating whether or not the second spatial relation indication is to be used for a limited duration.

At 1004, the access node uses the transmitted indications for receiving and/or transmitting signalling with the terminal.

It is understood in the above that the signals/indications received by the terminal from the access node may be sent by an appropriate communication mechanism. For example, the indications may be transmitted to the terminal using DCI. As another example, the indications may be transmitted to the terminal using an RRC-based mechanism. Different indications do not have to be transmitted using the same mechanism. However, it is understood that the different indications can be transmitted using the same mechanism.

The access node may determine a secondary spatial relation for at least one transmission to be made in the second direction. The access node may then use the determined secondary spatial relation for said at least one transmission after using said second spatial relation.

The access node may transmit a fourth indication to the terminal that indicates whether the second spatial relation indication is to be applied to transmissions made in the second direction on resources that are part of the same resource group as a resource on which the second transmission is made. In other words, the access node may transmit a fourth indication to the terminal that indicates whether or not the second spatial relation indication is to be applied to transmissions made in the second direction on resources that are part of the same resource group as a resource on which the second transmission is made.

The access node may transmit a fifth indication to the terminal that indicates a third spatial relation to be used for a third transmission in the second direction.

When the third indication indicates that the second spatial relation indication is to be used for a limited duration, the access node may transmit a sixth indication that indicates a number of transmissions to be made using the second spatial relation indication and/or the first spatial relation indication, wherein the using the received indications comprises using the second spatial relation indication and/or the first spatial relation indication for said limited duration.

When the third indication indicates that the second spatial relation indication is to be used for a limited duration, access node may transmit a sixth indication that indicates a duration in time for using the second spatial relation indication and/or the first spatial relation indication, wherein the using the received indications comprises using the second spatial relation indication and/or the first spatial relation indication for said limited duration.

Said second indication may indicate that said first spatial relation indication is also to be used for transmissions in the second direction.

Said third indication may further indicate whether the first spatial relation indication is to be used for the limited duration. In other words, said third indication may further indicate whether or not the first spatial relation indication is to be used for the limited duration.

When the third indication indicates that the second spatial relation indication is to be used for a limited duration, the access node may use a fourth spatial relation for transmissions to be made in the second direction after expiry of the limited duration, wherein the fourth spatial relation was also used for transmissions made in the second direction prior to the second spatial relation being used.

The first and second indications may be represented by a single codepoint.

The first and second indications may be represented by respective codepoints.

Figure 2:
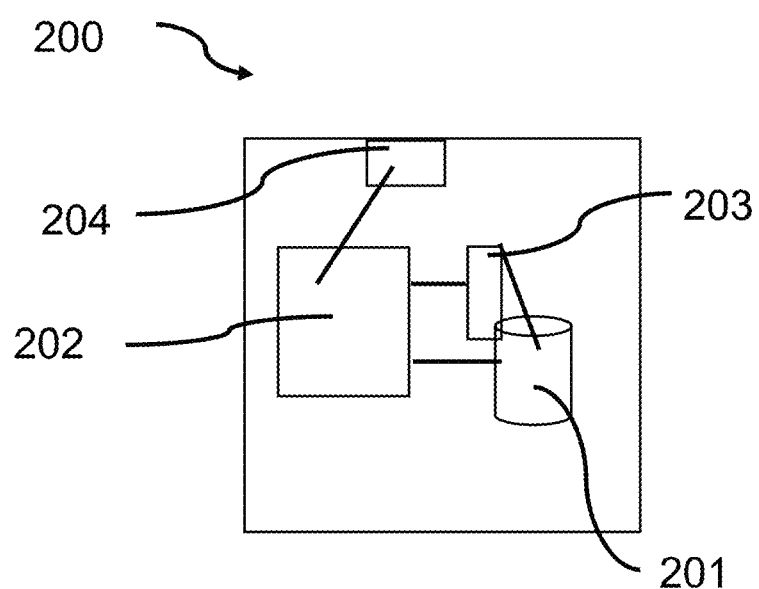
FIG. 2 shows a schematic representation of a network apparatus.

FIG. 2 shows an example of a control apparatus for a communication system, for example to be coupled to and/or for controlling a station of an access system, such as an access node, e.g. a base station, gNB, a central unit of a cloud architecture or a node of a core network such as an MME or S-GW, a scheduling entity such as a spectrum management entity, or a server or host, for example an apparatus hosting an NWDAF, AMF, SMF, UDM/UDR etc. The control apparatus may be integrated with or external to a node or module of a core network or Radio Access Network (RAN) Node. In some examples, base stations comprise a separate control apparatus unit or module. In other examples, the control apparatus can be another network element such as a radio network controller or a spectrum controller. The control apparatus 200 can be arranged to provide control on communications in the service area of the system. The apparatus 200 comprises at least one memory 201, at least one data processing unit 202, 203 and an input/output interface 204. Via the interface the control apparatus can be coupled to a receiver and a transmitter of the apparatus. The receiver and/or the transmitter may be implemented as a radio front end or a remote radio head. For example the control apparatus 200 or processor 201 can be configured to execute an appropriate software code to provide the control functions.

Figure 3:
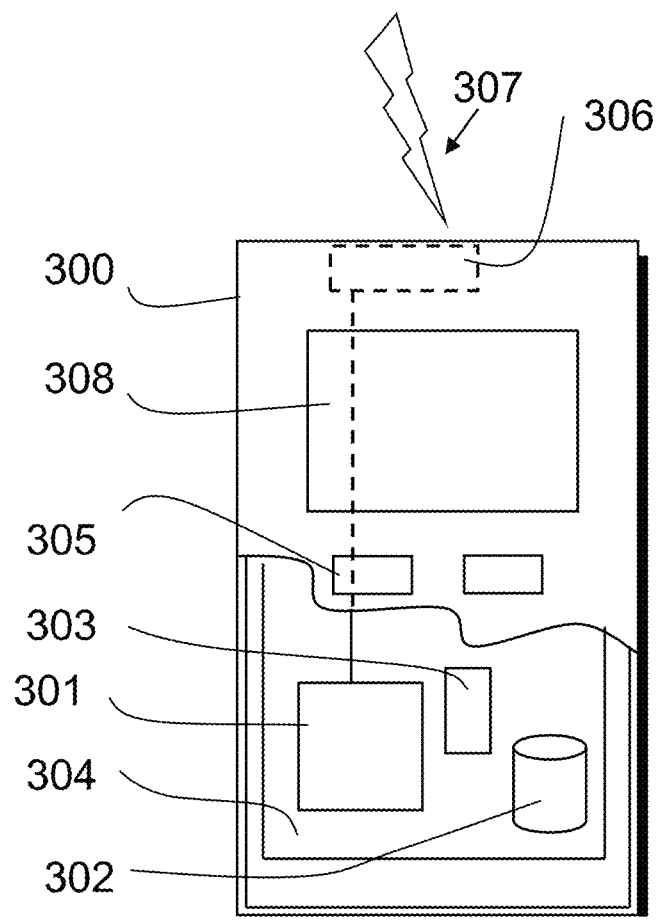
FIG. 3 shows a schematic representation of a user equipment.

A possible wireless communication device will now be described in more detail with reference to FIG. 3 showing a schematic, partially sectioned view of a communication device 300. Such a communication device is often referred to as user equipment (UE) or terminal. An appropriate mobile communication device may be provided by any device capable of sending and receiving radio signals. Non-limiting examples comprise a mobile station (MS) or mobile device such as a mobile phone or what is known as a 'smart phone', a computer provided with a wireless interface card or other wireless interface facility (e.g., USB dongle), personal data assistant (PDA) or a tablet provided with wireless communication capabilities, or any combinations of these or the like. A mobile communication device may provide, for example, communication of data for carrying communications such as voice, electronic mail (email), text message, multimedia and so on. Users may thus be offered and provided numerous services via their communication devices. Non-limiting examples of these services comprise two-way or multi-way calls, data communication or multimedia services or simply an access to a data communications network system, such as the Internet. Users may also be provided broadcast or multicast data. Non-limiting examples of the content comprise downloads, television and radio programs, videos, advertisements, various alerts and other information.

A wireless communication device may be for example a mobile device, that is, a device not fixed to a particular location, or it may be a stationary device. The wireless device may need human interaction for communication, or may not need human interaction for communication. In the present teachings the terms UE or "user" are used to refer to any type of wireless communication device.

The wireless device 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the wireless device.

A wireless device is typically provided with at least one data processing entity 301, at least one memory 302 and other possible components 303 for use in software and hardware aided execution of tasks it is designed to perform, including control of access to and communications with access systems and other communication devices. The data processing, storage and other relevant control apparatus can be provided on an appropriate circuit board and/or in chip-sets. This feature is denoted by reference or 304. The user may control the operation of the wireless device by means of a suitable user interface such as key pad 305, voice commands, touch sensitive screen or pad, combinations thereof or the like. A display 308, a speaker and a microphone can be also provided. Furthermore, a wireless communication device may comprise appropriate connectors (either wired or wireless) to other devices and/or for connecting external accessories, for example hands-free equipment, thereto.

Figure 4:
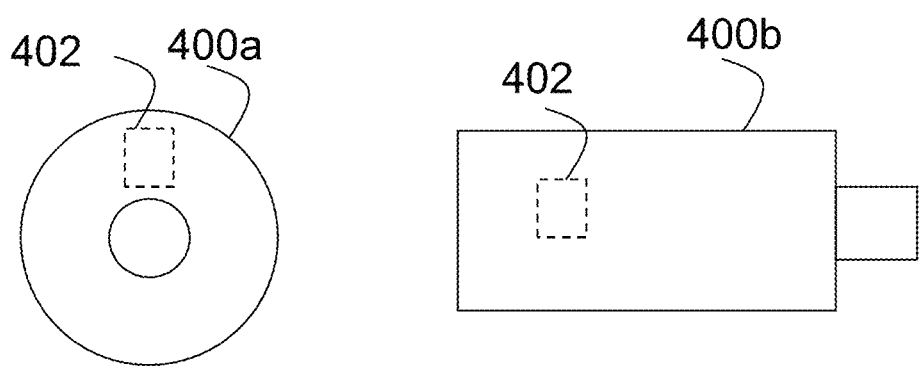
FIG. 4 shows a schematic representation of a non-volatile memory medium storing instructions which when executed by a processor allow a processor to perform one or more of the steps of the methods of some examples.

FIG. 4 shows a schematic representation of non-volatile memory media 400a (e.g. computer disc (CD) or digital versatile disc (DVD)) and 400b (e.g. universal serial bus (USB) memory stick) storing instructions and/or parameters 402 which when executed by a processor allow the processor to perform one or more of the steps of the methods of FIGS. 9 to 10.

The examples may thus vary within the scope of the attached claims. In general, some examples may be implemented in hardware or special purpose circuits, software, logic or any combination thereof. For example, some aspects may be implemented in hardware, while other aspects may be implemented in firmware or software which may be executed by a controller, microprocessor or other computing device, although examples are not limited thereto. While various examples may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The examples may be implemented by computer software stored in a memory and executable by at least one data processor of the involved entities or by hardware, or by a combination of software and hardware. Further in this regard it should be noted that any procedures, e.g., as in FIGS. 9 to 10, may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs), application specific integrated circuits (ASIC), gate level circuits and processors based on multi-core processor architecture, as non-limiting examples.

Alternatively or additionally some examples may be implemented using circuitry. The circuitry may be configured to perform one or more of the functions and/or method steps previously described. That circuitry may be provided in the base station and/or in the communications device.

As used in this application, the term "circuitry" may refer to one or more or all of the following:
(a) hardware-only circuit implementations (such as implementations in only analogue and/or digital circuitry);
(b) combinations of hardware circuits and software, such as:
   (i) a combination of analogue and/or digital hardware circuit(s) with software/firmware and
   (ii) any portions of hardware processor(s) with software (including digital signal processor(s)), software, and memory(ies) that work together to cause an apparatus, such as the communications device or base station to perform the various functions previously described; and
(c) hardware circuit(s) and or processor(s), such as a microprocessor(s) or a portion of a microprocessor (s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example integrated device.

The foregoing description has provided by way of exemplary and non-limiting examples a full and informative description of some examples. However, various modifications and adaptations may become apparent to those skilled in the relevant arts in view of the foregoing description, when read in conjunction with the accompanying drawings and the appended claims. However, all such and similar modifications of the teachings will still fall within the scope as defined in the appended claims.

The invention claimed is:

1. An apparatus for a terminal, comprising:
   at least one memory configured to store instructions; and
      at least one processor configured to execute the instructions and cause the apparatus to perform,
   receiving from at least one access node a first spatial relation indication for a first transmission to be made in a first direction;
   receiving from the at least one access node a second spatial relation indication for a second transmission to be made in a second direction;
   receiving from the at least one access node a third indication indicating whether the second spatial relation indication is to be used for a limited duration; and
   using the received indications for receiving and/or transmitting signalling with at the least one access node,
   wherein when the third indication indicates that the second spatial relation indication is to be used for a limited duration, the apparatus is further caused to perform, using a fourth spatial relation for transmissions to be made in the second direction after expiry of the limited duration, wherein the fourth spatial relation was also used for transmissions made in the second direction prior to the second spatial relation being used.

2. An apparatus as claimed in claim 1, wherein the apparatus is further caused to perform, determining a secondary spatial relation for at least one transmission to be made in the second direction; and using the determined secondary spatial relation for said at least one transmission after using said second spatial relation.

3. An apparatus as claimed in claim 1, wherein the apparatus is further caused to perform, receiving a fourth indication from the at least one access node that indicates whether the second spatial relation indication is to be applied to transmissions made in the second direction on resources that are part of the same resource group as a resource on which the second transmission is made.

4. An apparatus as claimed in claim 1, wherein the apparatus is further caused to perform, receiving a fifth indication from the at least one access node, wherein the fifth indication indicates a third spatial relation indication to be used for a third transmission in the second direction.

5. An apparatus as claimed in claim 1, wherein when the third indication indicates that the second spatial relation indication is to be used for a limited duration, the apparatus is further caused to perform, receiving a sixth indication that indicates a number of transmissions to be made using the second spatial relation indication and/or the first spatial relation indication, and the using the received indications comprises using the second spatial relation indication and/or the first spatial relation indication for said limited duration.

6. An apparatus as claimed in claim 1, wherein when the third indication indicates that the second spatial relation indication is to be used for a limited duration, the apparatus is further caused to perform, receiving a sixth indication that indicates a duration in time for using the second spatial relation indication and/or the first spatial relation indication, wherein the means for using the received indications comprises using the second spatial relation indication and/or the first spatial relation indication for said limited duration.

7. An apparatus as claimed in claim 1, wherein said second indication indicates that said first spatial relation indication is also to be used for transmissions in the second direction.

8. An apparatus as claimed in claim 1, wherein said third indication further indicates whether the first spatial relation indication is to be used for the limited duration.

9. An apparatus as claimed in claim 1, wherein the first and second indications are represented by a single codepoint.

10. An apparatus as claimed in claim 1, wherein the first and second indications are represented by respective codepoints.

11. An apparatus for an access node, comprising:
   at least one memory configured to store instructions; and
      at least one processor configured to execute the instruction and cause the apparatus to perform, transmitting to a terminal a first spatial relation indication for a first transmission to be made in a first direction;

transmitting to the terminal a second spatial relation indication for a second transmission to be made in a second direction;

transmitting to the terminal a third indication indicating whether the second spatial relation indication is to be used for a limited duration; and using the transmitted indications for receiving and/or transmitting signalling with the terminal, wherein when the third indication indicates that the second spatial relation indication is to be used for a limited duration, the apparatus is further caused to perform, using a fourth spatial relation for transmissions to be made in the second direction after expiry of the limited duration, wherein the fourth spatial relation was also used for transmissions made in the second direction prior to the second spatial relation being used.

12. An apparatus as claimed in claim 11, wherein the apparatus is further caused to perform, determining a secondary spatial relation for at least one transmission to be made in the second direction; and using the determined secondary spatial relation for said at least one transmission after using said second spatial relation.

13. An apparatus as claimed in claim 11, wherein the apparatus is further caused to perform, transmitting a fourth indication from the at least one access node that indicates whether the second spatial relation indication is to be applied to transmissions made in the second direction on resources that are part of the same resource group as a resource on which the second transmission is made.

14. An apparatus as claimed in claim 11, wherein the apparatus is further caused to perform, transmitting a fifth indication to the terminal that indicates a third spatial relation to be used for a third transmission in the second direction.

15. An apparatus as claimed in claim 11, wherein when the third indication indicates that the second spatial relation indication is to be used for a limited duration, the apparatus is further caused to perform, transmitting a sixth indication that indicates a number of transmissions to be made using the second spatial relation indication and/or the first spatial relation indication, and the using the received indications comprises using the second spatial relation indication and/or the first spatial relation indication for said limited duration.

16. An apparatus as claimed in claim 11, wherein when the third indication indicates that the second spatial relation indication is to be used for a limited duration, the apparatus is further caused to perform, transmitting a sixth indication that indicates a duration in time for using the second spatial relation indication and/or the first spatial relation indication, and the using the received indications comprises using the second spatial relation indication and/or the first spatial relation indication for said limited duration.

17. A method for an apparatus for a terminal, the method comprising:

receiving from at least one access node a first spatial relation indication for a first transmission to be made in a first direction;

receiving from the at least one access node a second spatial relation indication for a second transmission to be made in a second direction;

receiving from the at least one access node a third indication indicating whether the second spatial relation indication is to be used for a limited duration; and using the received indications for receiving and/or transmitting signalling with the at least one access node, wherein when the third indication indicates that the second spatial relation indication is to be used for a limited duration, the method further comprises using a fourth spatial relation for transmissions to be made in the second direction after expiry of the limited duration, wherein the fourth spatial relation was also used for transmissions made in the second direction prior to the second spatial relation being used.

18. A method for an apparatus for an access node, the method comprising:

transmitting to a terminal a first spatial relation indication for a first transmission to be made in a first direction;

transmitting to the terminal a second spatial relation indication for a second transmission to be made in a second direction;

transmitting to the terminal a third indication indicating whether the second spatial relation indication is to be used for a limited duration; and using the transmitted indications for receiving and/or transmitting signalling with the terminal, wherein when the third indication indicates that the second spatial relation indication is to be used for a limited duration, the method further comprises using a fourth spatial relation for transmissions to be made in the second direction after expiry of the limited duration, wherein the fourth spatial relation was also used for transmissions made in the second direction prior to the second spatial relation being used.

* * * * *